Patented July 18, 1939

2,166,549

UNITED STATES PATENT OFFICE 2,166,549

ALKALI NITRITES AND CHROMATES

Napoleon A. Laury, Bound Brook, N. J., assignor to The Calco Chemical Co., Inc., Bound Brook, N. J., a corporation of Delaware No Drawing. Application June 23, 1937, Serial No. 149,927

7 Claims. (Cl. 23—56)

This invention relates to an improved process of producing nitrites and chromates of strongly electropositive metals.

Alkali metal nitrites such as sodium nitrite are used in large quantities in the production of azo dyes and the main source of nitrites at the present time is from ammonia oxidation plants. In such plants the gases are passed through a nitric acid absorber and the tail gases which are not absorbed consist of NO and $NO_2$ in approximately equal molecular proportions. It is customary to absorb these tail gases in a sodium carbonate solution which produces a mixture of sodium nitrate and sodium nitrite. The solution is then concentrated until it contains about 50% of sodium nitrite and cooled to produce crystallization. The crystals obtained are pure sodium nitrite but the mother liquor contains sodium nitrate and when further crops of crystals are obtained by concentration of the mother liquor they are contaminated by increasing quantities of sodium nitrate so that it is necessary to reject a considerable amount of the mother liquor which has previously been used for the most part in fertilizer plants. This represents a loss because the value of the sodium nitrite contained in the mother liquor as a fertilizer is much less than its value as nitrite.

According to the present invention the losses resulting from discarding the mother liquor are avoided and sodium nitrite of high purity can be produced at a reasonable cost because it is not necessary to produce more than one crop of crystals due to the fact that the mother liquor is not being wasted or sold for a purpose for which it commands a low price. According to the present invention, the mother liquor containing sodium nitrite and sodium nitrate is treated with chromium residues or with chrome ore in a furnace. This transforms all of the chromous oxide into sodium chromate and decomposes the nitrate and nitrite into a mixture of $NO_2$ and NO in the proportion of 1 mol of $NO_2$ to 3 mols of NO. The reaction is as follows:

$$Cr_2O_3 + 2NaNO_3 + 2NaNO_2 \rightarrow 2Na_2CrO_4 + NO_2 + 3NO$$

The sodium chromate is readily salable and the gases are simply mixed with the tail gases from the nitric acid plant and are again contacted with sodium carbonate. The loss of nitrogen is therefore very small and the additional equipment is offset by the profit from the sale of chromate.

While the invention is not limited to any particular proportions, I have found that the oxidation of chrome ore proceeds more effectively if there is a small excess for example from 10–15% of the sodium nitrate and sodium nitrite.

The temperature at which the chrome oxidation takes place is not particularly critical and the range from about 600 to 800° C. is useful. The reaction velocity at 600° is however somewhat low and for best results I prefer to operate between 700 and 800° C. and preferably at about 750° C. As there is some softening of the charge, the most convenient mechanical handling is in a continuous rotary kiln although the invention is not limited to the use of this type of apparatus and any suitable furnace may be employed. By reason of the high temperature it is desirable to use heat resistant alloys in the furnace such as chrome-nickel steel.

It will be noted that the proportion of $NO_2$ to NO in the equation given above differs from equality. If the mother liquor is richer in nitrate the relative proportion of $NO_2$ is of course increased according to the following reaction:

$$Cr_2O_3 + 4NaNO_3 \rightarrow 2Na_2CrO_4 + 3NO_2 + NO$$

The composition of the mother liquor will therefore determine the relative proportion of $NO_2$ and NO in the gases leaving the chrome oxidation furnace. Since, however, the normal mother liquor more closely approaches the composition given by the first reaction, the gases normally have more NO than $NO_2$ and a sufficient amount of air may be incorporated to restore the balance. If there should be an excess of $NO_2$ some NO direct from an ammonia burner can be introduced.

It is an advantage of the present invention that the ordinary equipment in making sodium nitrite is utilized fully in handling the gases leaving the chrome oxidation furnace and they are transformed into nitrite by the same process as is used on the original tail gases from the nitric acid plant. The process is therefore a continuous one.

The present invention should not be confused with a process which has been proposed whereby sodium nitrate is reduced with chrome residues in the presence of alkali. This produces, it is true, sodium nitrite but the nitrite is contaminated with chromate and an expensive process is necessary to separate the two. The present invention is based on the discovery that if the alkali is omitted the oxidation of the chromium compounds produces gases directly of the same nature as are present in the tail gases from the nitric acid plant and can therefore be directly recirculated.

The particular chromous oxide compounds to be used will depend on those most readily available. In some places where by-products from chromate oxidation of organic compounds are available, these constitute a very cheap waste material which can be effectively used. In other cases, chromium oxide ores are available more cheaply and in such locations they would constitute the preferred raw material. The choice is almost purely one of economics as the process operates with substantially the same efficiency with any chromium oxide material.

The invention will be described in detail in conjunction with a specific example which illustrates a preferred embodiment of the invention.

Example

Tail gases from a nitric acid plant are passed through a packed tower lined with acid resistant brick through which is circulated a sodium carbonate solution containing about 22% of sodium carbonate. The tail gases are blown into the base of the tower at such a rate that the solution absorbs them and the amount of unabsorbed nitrogen oxide leaving the tower is so low that they are invisible. The tail gases consist of NO and $NO_2$ and react with the carbonate to form sodium nitrite and $CO_2$ according to the following reaction:

$$Na_2CO_3 + NO_2 + NO \rightarrow 2NaNO_2 + CO_2$$

The gases contain free oxygen and therefore some nitrate is found. The absorption is continued until the solution is nearly saturated containing only ½% of unreacted sodium carbonate. It is then removed and evaporated until it contains 50% sodium nitrite. Thereupon it is cooled and sodium nitrite crystals are removed.

The mother liquor which contains both sodium nitrite and sodium nitrate is evaporated to form a solid cake and mixed with chromium oxide compounds, either chrome ore or the chrome sludge from organic oxidations. The mixture is heated in an indirectly fired rotary kiln for two hours at 750° C. The proportions of chromium oxide to mother liquor should be 1 mol of chromium oxide for 2 mols of sodium compound plus a small excess (10–15%) of the sodium salts. Nitrogen oxides are evolved and as they contain somewhat more NO than $NO_2$ some air is mixed with the furnace tail gases to produce equal molecular proportions of NO to $NO_2$. The gases are cooled and mixed with fresh tail gases from the nitric acid plant and passed through the sodium carbonate absorbing tower.

The furnace charge is then dissolved in water and filter pressed, over 95% of the chromium in the material being obtained in the form of sodium chromate. The filtrate is agitated and cooled and high grade sodium chromate crystallizes out.

The invention has been described more particularly in connection with the production of sodium nitrite as this is the form in which nitrites are mainly used commercially. The process, however, does not depend on any peculiar behavior of the sodium compound. On the contrary, it is generally applicable to the nitrites of the strongly electropositive metals such as the alkali metals and alkaline earth metals. Thus, for example, the process is equally effective with potassium nitrite where for special uses the additional cost of this product makes it worth while. Similarly, in the place of the sodium carbonate in the absorbing tower, the carbonates of magnesium, calcium, strontium and barium may be used. Some of these carbonates, notably calcium carbonate, are very insoluble and hence they will not form a water solution in the tower but have to be used in the form of a slurry or dispersion. Of course, the corresponding chromate is formed and in the case of barium this is already known as a pigment.

I claim:

1. A method of producing chromates and nitrites of alkali forming metal which comprises treating the tail gases from an ammonia oxidation nitric acid plant with an aqueous dispersion of the metal carbonate to form a mixture of nitrate and nitrite, concentrating the solution and cooling to crystallize out the nitrite substantially free from nitrate, evaporating to dryness the nitrites and nitrates of the mother liquor, mixing the solid nitrites and nitrates with chromium oxide containing material in the approximate proportion of 1 mol of chromium oxide to 2 mols of nitrate and nitrite, and heating the mixture to 600–800° C. whereby metal chromate and a mixture of nitrogen oxides is obtained and mixing the gases with the tail gases from the nitric acid plant.

2. A method of producing sodium chromate and sodium nitrite which comprises treating tail gases from an ammonia oxidation nitric acid plant with an aqueous solution of sodium carbonate to form a mixture of sodium nitrate and sodium nitrite, concentrating the solution and cooling to crystallize out the sodium nitrite substantially free from sodium nitrate, evaporating to dryness the mother liquor containing sodium nitrite and sodium nitrate, mixing the solid nitrites and nitrates with chromium oxide containing material in the approximate proportion of 1 mol of chromium oxide to 2 mols of sodium nitrate and sodium nitrite, and heating the mixture to 600–800° C., whereby sodium chromate and a mixture of nitrogen oxides is obtained.

3. A method according to claim 2 in which the crystallization of sodium nitrite is effected when the solution has been concentrated to approximately 50% sodium nitrite.

4. A method according to claim 2 in which the chromium oxide treatment is effected at 700–800° C.

5. A method according to claim 2 in which the chromium oxide treatment is effected at 750° C.

6. A method according to claim 2 in which the sodium nitrate and nitrite in the mother liquor is present in approximately 10–15% excess over twice the moles of the chromium oxide.

7. A method according to claim 2 in which the composition of nitrogen oxide gases from the chromium oxide reduction process is adjusted so that they contain approximately equal proportions of $NO_2$ and NO, the adjustment being effected by the addition of oxygen or NO respectively.

NAPOLEON A. LAURY.